March 23, 1965 J. G. McKERNAN 3,174,334
CABLE TENSIOMETER
Filed May 10, 1962 2 Sheets-Sheet 2

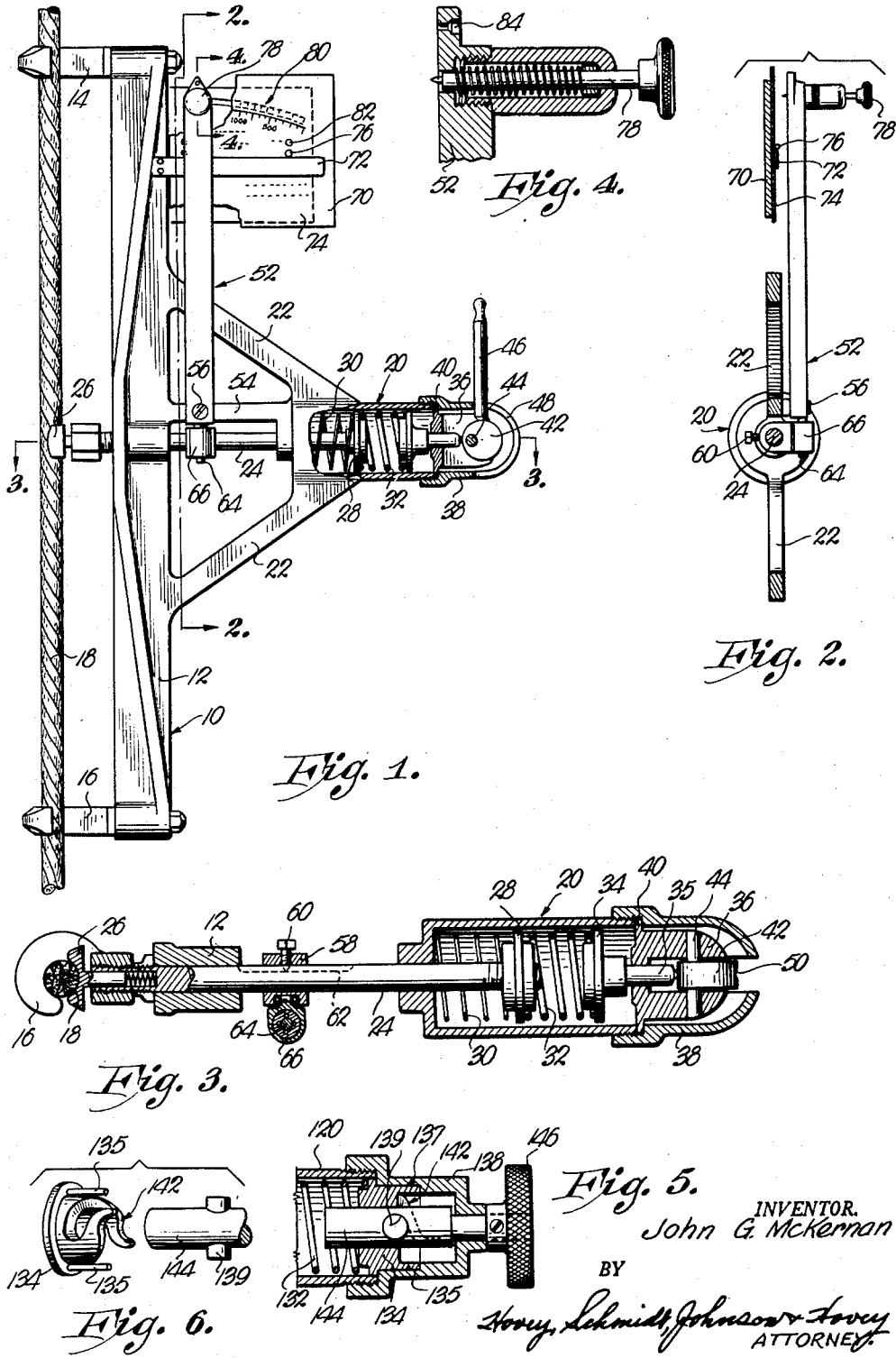

INVENTOR.
John G. McKernan
BY
Hovey, Schmidt, Johnson & Hovey
ATTORNEYS.

United States Patent Office 3,174,334
Patented Mar. 23, 1965

3,174,334
CABLE TENSIOMETER
John G. McKernan, 719 E. 71st Terrace, Kansas City, Mo.
Filed May 10, 1962, Ser. No. 193,767
2 Claims. (Cl. 73—144)

This invention relates to precision instruments, and more particularly, to a device for testing the tension of cables, taking the form of a tool capable of determining either the actual tension on load carrying cable or the relative tension between a plurality of such cables while in use.

The most important object of this invention is to improve upon the structure of my U.S. Letters Patent No. 2,618,153, dated November 18, 1952, embodying a cable-testing device adapted for attachment to a cable or the like while the same is in operative use supporting a load, and operable to accurately measure the extent of deflection of a portion of the cable upon manual manipulation of an externally threaded screw.

More particularly, it is an important object of the instant invention to improve upon the structure for actuating the reciprocable pressure bar of a cable tensiometer in the nature of that disclosed in my patent above identified by providing manually manipulable parts capable of quickly and expeditiously compressing the spring backing up the pressure bar and releasing such tension on the spring after the test has been made and recorded.

A further important object of the instant invention is to provide actuating structure for cable tensiometers which assures that the aforementioned spring is tensioned in the same amount each time the instrument is placed in use.

Still another object of the present invention is the provision of a tool of the type described in my abovementioned patent wherein the tool is provided with easily interchangeable parts rendering the tool capable of determining the absolute tension on a cable or of determining relative tensions on a group of interrelated cables, thus obviating the necessity for an additional tool for accomplishing the above determinations.

In the drawings:

FIGURE 1 is a side elevational view of one embodiment of the cable tensiometer made pursuant to the present invention, showing the same operably attached to a cable for determining the relative tension thereof, parts being broken away and in section for clearness;

FIG. 2 is a cross-sectional view taken on line 2—2 of FIG. 1;

FIG. 3 is an enlarged, cross-sectional view taken on line 3—3 of FIG. 1;

FIG. 4 is an enlarged, fragmentary, detailed, cross-sectional view taken on line 4—4 of FIG. 1;

FIG. 5 is a fragmentary, detailed, cross-sectional view similar to FIG. 3, showing a modified form of the instant invention;

FIG. 6 is a fragmentary, exploded perspective view illustrating the components of the embodiment of FIG. 5;

FIG. 10 is a cross-sectional view taken along line 10—10 of FIG. 9; and

Figure 7:
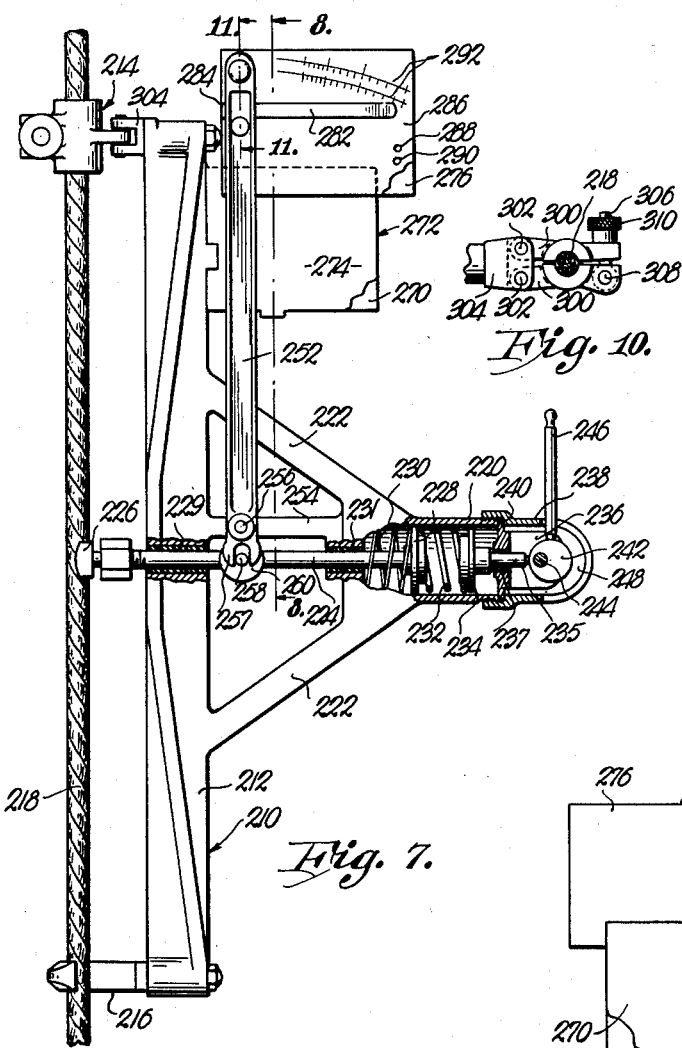
FIG. 7 is a side elevational view of a second embodiment of the tensiometer made pursuant to the present invention, showing the same operably attached to a cable for determining the absolute tension thereon, parts being broken away and in section to illustrate details of construction.
Figure 8:
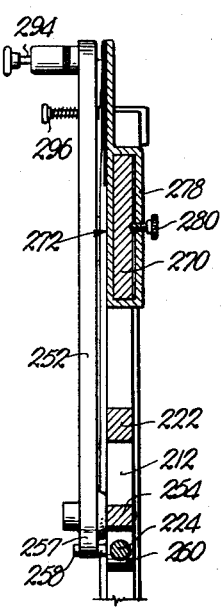
FIG. 8 is a cross-sectional view taken along line 8—8 of FIG. 7.
Figure 9:
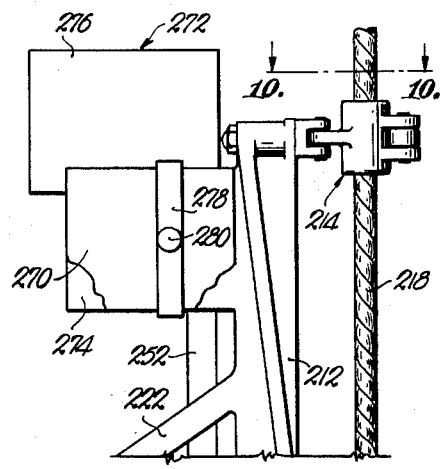
FIG. 9 is a fragmentary, elevational view of one end of the tensiometer on the side thereof opposite to the side illustrated in FIG. 7, showing the cable clamp for securing the cable to the tensiometer.
Figure 11:
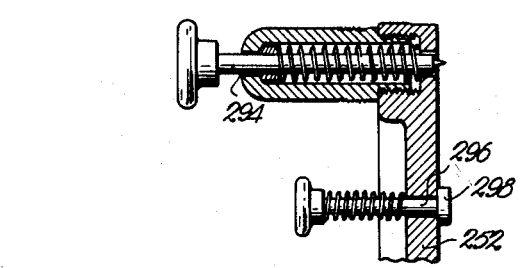
FIG. 11 is an enlarged, cross-sectional view taken along line 11—11 of FIG. 7.

A first embodiment of the tensiometer is shown in FIGS. 1–4 and includes a frame broadly designated by the numeral 10. Frame 10 includes an elongated bar 12 provided at the ends thereof with a pair of laterally extending cable-engaging devices in the nature of hooks 14 and 16 which are looped about cable 18 when the tensiometer is placed in use to measure relative tensions on a number of interrelated cables 18.

An elongated, hollow body 20 is attached to bar 12 by supports 22 forming a part of the frame 10, and an elongated pressure rod 24 is slidably carried by the frame 10 between the hooks 14 and 16. Rod 24 extends into one end of the body 20 and has a cable-engaging foot 26 mounted on one end thereof. A head 28 on the opposite end of the rod 24 is interposed between a pair of springs 30 and 32, both of which are contained within the hollow body 20.

A tension element 34 within the body 20 is provided with a guide stem 35 reciprocably carried by bearing member 36 that is housed within a cap 38 closing the outermost end of the body 20. An outturned, annular flange 40 integral with the member 36 is interposed between cap 38 and body 20 to hold the member 36 in place.

The member 36 is bifurcated to clear a disc-type cam 42, eccentrically mounted for rotation with respect to the member 36 through the medium of a transverse shaft 44. An operating handle 46 for the cam 42 extends through a slot 48 within the cap 38. Diametrically opposed indentations 50 within the periphery of disc 42 receive the proximal end of the guide stem 35 of tension element 34.

An elongated arm 52 is swingably mounted on crossbar 54 forming a part of the frame 10 through the medium of a pivot pin 56. One end of the arm 52 is attached to the rod 24 through the medium of a collar 58 on the latter which is in turn adjustable longitudinally of the rod 24 by virtue of a setscrew 60 seated within a longitudinal groove 62 in rod 24.

A pin 64 rigid to arm 52 and depending therefrom, is longitudinally slidable within a head 66, the latter of which in turn is swingably attached to the collar 58. It is noted in FIG. 3 of the drawing that antifriction bearing means is provided between the pin 64 and the head 66, as well as between the latter and the collar 58.

The arm 52 extends outwardly from rod 24 as is clear in FIG. 1, and the normally upper end of the arm 52 overlaps a laterally extending plate 70 rigid to the bar 12 of frame 10. A leaf spring 72 between plate 70 and arm 52 is secured to the bar 12 and yieldably clamps a record card 74 to one face of plate 70. Card 74 is held properly positioned on the plate 70 by virtue of pins 76 on the plate 70 extending through the card 74.

A spring-loaded, card-piercing plunger 78 is mounted on the arm 52 adjacent the uppermost end of the latter, and card 74 is provided with a graduated scale 80 coincident with the arcuate path of travel traversed by piercing pin 78 when arm 52 is swung about pivot pin 56 incident to reciprocable movement of the pressure rod 24.

It is clear from the foregoing that the extent of swinging movement of the arm 52 is a function of the deflection of cable 18 after handle 46 is swung from the position shown in FIG. 1 of the drawing to the lowermost end of its path of travel. Such swinging of the handle 46 rotates the cam disc 42 about the axis of shaft 44, thereby forcing the guide stem 35, and therefore, the tension element 34 inwardly along the body 20 to compress spring 32. Such measured deflection of the cable 18 is recorded by manually pressing the piercing plunger 78 inwardly to form a small hole in the card 74 adjacent the arcuate, graduated scale 80. After the relative tension on a given cable 18 has been determined by forcing the hole in card 74 by plunger 78, the tensiometer is then operably coupled to another cable 18 to obtain the relative tension thereon. In this way, the relative tensions on a number of such cables 18 may be obtained for adjustment or inspection purposes.

In FIGS. 5 and 6 of the drawing there is illustrated a modified form of quickly actuated and quickly released structure for compressing spring 132 which is, of course, comparable to the spring 32 shown in FIGS. 1 and 3. A tension element 134 is provided with a pair of diametrically opposed guide stems 135, and cap 138 for hollow body 120 is provided with appropriate grooves 137 receiving the stems 135 and permitting reciprocation thereof, while at the same time holding the element 134 against rotation with respect to the cap 138.

A shaft 144 extending through the element 134, is rotatable with respect to the latter and is also rotatably carried by the cap 138 but held against reciprocation with respect to the latter. An operating disc or knob 146 is secured to the outermost end of the shaft 144. Cam means 142 on the element 134 is engaged by a cross pin 139 rigid to the shaft 144. It is manifest that rotation of the knob 146 reciprocates element 134 to compress and release spring 132 through the cooperative action of cross pin 139 acting on the cam means 142.

The instrument above described may be used to equalize the tension of a plurality of cables as, for example, those which operably support an elevator. Initially, the tension measurement of one of the cables is made on card 74 through use of piercing element 78 along the lower arcuate line of the scale 80. Thereupon, card 74 is moved downwardly where openings 82 thereof are received by pins 76. During adjustment of the remaining cables to equalize the tensions thereof with respect to the tension of the one cable, a pencil or other marking device may be employed through hole 84 in arm 52 to mark card 74 adjacent the upper portion of scale 80 until such time as the tests and adjustments have been completed.

When it is desired to determine the absolute tension on a cable, the second embodiment, shown in FIGS. 7-11 of the invention, is preferably utilized, although it is clear that the embodiment shown in FIGS. 1-4 can also be used to determine absolute tension if a properly calibrated scale card 74 is employed.

The second embodiment includes a frame which is substantially identical with frame 10 of the first embodiment. Frame 210 includes an elongated bar 212 having a cable clamp 214 at one end thereof and a cable-engaging hook 216 at the opposite end thereof. Clamp 214 and hook 216 provide devices for mounting frame 210 on a cable 218 to be tested. A tubular body 220 is secured to bar 212 by a pair of angularly disposed supports 222, and receives an elongated pressure rod 224 extending outwardly therefrom through bar 212 toward cable 218.

A cable-engaging foot 226 is at one end of rod 224 for engaging cable 218, and a head 228 is secured to the opposite end of rod 224 within body 220. Rod 224 is shiftable into and out of body 220 within bearings 229 and 231 carried by frame 210 within bar 212 and at the junction of supports 222. Bearings 229 and 231 are preferably formed from Teflon sleeves to minimize the wear on bearings 229 and 231 as a result of the shifting action of rod 224.

A pair of coil springs 230 and 232 are disposed within body 220 on opposed sides of head 228, and a tension element 234 is shiftably mounted within body 220 is engagement with spring 232 in the manner shown in FIG. 7. A stem 235 projects outwardly from element 234 in a direction away from spring 232 and passes through an opening in the bight of a U-shaped bearing member 236. A bearing 237 in the nature of a Teflon sleeve is disposed within the opening in the bight of bearing member 236 to facilitate the shifting action of stem 235.

A cap 238 is threadably mounted on the proximal end of body 220 and forces a flange 240 on bearing member 236 against the annular edge of body 220 to maintain member 236 in a fixed position with respect to body 220. A disc-type cam 242 is eccentrically mounted on a shaft 244 spanning the distance between the sides of member 236, and a handle 246 rigid to cam 242 on the periphery thereof extends through a slot 248 in cap 238.

Manifestly, cam 242 is provided with a pair of circumferentially spaced indentations on the periphery thereof for receiving the tip of stem 235 to substantially maintain cam 242 is fixed positions. As shown in FIG. 7, tension element 234 is at the outermost end of its normal path of travel when handle 246 extends in the direction shown in FIG. 7. When handle 246 is rotated to a position extending in the opposite direction, cam 242 operates to force stem 235 into body 220 to compress spring 232, and thereby advance rod 224 toward cable 218.

An elongated arm 252 is pivotally mounted on a crossbar 254 by means of a pivot pin 256 and is provided with a bifurcated, normally innermost end 257 which complementally receives a pin 258 extending outwardly from a cylindrical member 260 having a centrally disposed bore therein intermediate the ends thereof for receiving rod 224 therethrough. Member 260 is disposed between bearings 229 and 231 and in spaced relationship to crossbar 254. Movement of rod 224 toward or away from cable 218 is sufficient to rotate arm 252 in clockwise and counterclockwise directions respectively.

A first plate 270 corresponding to plate 70 of the first embodiment, extends laterally from bar 212 adjacent the end thereof on which clamp 214 is mounted. A second plate 272, having inner and outer portions 274 and 276 is mounted on plate 270. A U-shaped strip 278, secured to one face of plate 272, forms a tubular bracket having a setscrew 280 therein for receiving plate 270 with the screw 280 bearing against the proximal face of plate 270. Thus, plate 272 is removably mounted on plate 270 to provide an extension therefor. Plate 272 carries a spring clip 282 which is secured at one end 284 thereof to the face of plate 272 adjacent arm 252, it being clear that arm 252 substantially spans the distance between rod 224 and the outermost marginal edge of plate 272.

Clip 282 is utilized for maintaining a record card 286 in place on plate 272, card 286 being disposed substantially on the outer portion 276 of plate 272. Card 286 is provided with a number of openings 288 for receiving a pin 290 projecting outwardly from the proximal face of portion 276. Openings 288 thus correspond to the scales 292 on card 286, scales 292 being calibrated to record absolute tensions on cables of differing diameters. Thus, the outermost scale shown on card 286 may be utilized for measuring the tension on a cable of a first diameter, and the innermost scale may be utilized for determining the tension on a cable of a greater diameter than that of the cable tested by the outer scale. Openings 288 thus correspond to the size of cable to be tested.

A card marking plunger 294 is mounted on the outermost end of arm 252 for providing an indentation in card 286 to indicate the absolute tension of a particular cable 218. An arm holding device 296 is carried by arm 252 adjacent plunger 294 and includes a card-engaging head 298 which is forced against card 286 as device 296 is forced in one direction through arm 252. The user of the tensiometer, in taking a measurement, first forces head 298 against card 286 to steady arm 252 and then forces plunger 294 against card 286 to mark the same.

Clamp 214 is provided with a pair of semicircular jaws 300 pivotally mounted by means of pins 302 within a bifurcated element 304 releasably secured to bar 212. One of jaws 300 is provided with a bifurcated side for receiving a screw 306 pivotally mounted on the other jaw 300 by a pin 308. A knurled nut 310 is threadably mounted on screw 306 and normally bears against the bifurcations of said one jaw 300 when the jaws 300 are clamped about a cable 218. Clamp 214 is disposed on the normally upper end of frame 210 to confine the sensitive motion of cable 218 between the weight suspended on the cable and the point of contact of the cable by foot 226. Arm 252 is of a greater length than arm 52 of the embodiment of FIGS. 1–4 so as to result in a longer arc at the outer end of the arm for a given deflection of rod 224. Thus, the embodiment of the invention shown in FIGS. 7–11 is more sensitive than that shown in FIGS. 1–4 and is, therefore, more suitable for determining absolute tensions than the first embodiment.

In use, the tensiometer illustrated in FIGS. 7–11, is mounted on a cable 218 by clamping jaws 300 about the cable and hooking the cable within hook 216. Handle 246 is swung about the axis of shaft 244 until the same projects outwardly from cam 242 in a direction opposite to that illustrated in FIG. 7. Thereupon, arm 252 is swung about pin 256 in response to the movement of rod 224 toward cable 218. The deflection of arm 252, therefore, is proportional to the tension of cable 218 and, since card 286 is calibrated in units of absolute tension, the marking of card 286 by plunger 294 thus indicates the absolute tension on cable 218. For cables of differing diameters, card 286 is shifted so that pin 290 is received within the corresponding opening 288 in card 286.

In determining the weight of an object, such as a passenger elevator, suspended by a number of cables, the following steps are recommended for utilizing the tensiometer of FIGS. 7–11 performing this measurement:

(1) Take all tension readings on the cables as close as possible to the bottom of the path of travel of the elevator;

(2) Measure the tension of all of the cables suspending the elevator (on a compound hitch where the sheave is in the crosshead of the elevator, measurements should be taken from both stationary and moving cables; on some installations where compounded, the front cable readings are taken while standing on a floor in front of the elevator);

(3) Combine the weight of all persons engaged in taking the measurements if the persons are standing on or in the elevator when the measurements are taken;

(4) Obtain the weight of all compensating chains or cables and the control cable from the bottom of the elevator to the elevator pit (if compensation is by cable alone, include one-half of the sheave and tension device in the elevator pit); and (5) Deduct the weight of all persons engaged (step 3) along with the weights of the suspension and control cables from the total cable readings to obtain the weight of the elevator.

Although this device is not of true scale accuracy, if properly used, it should produce results of approximately 1% of the actual weight of an elevator.

The tensiometer illustrated in FIGS. 7–11 may be utilized for determining the absolute tension on a cable or the relative tensions on a group of interrelated cables in the manner set forth above in the case of the tensiometer illustrated in FIGS. 1–4. To utilize the tensiometer to measure absolute tensions, record card 286 is mounted on plate 272 and arm 252 is utilized with rod 224 to move the card-marking plunger 294 into a position where card 286 may be marked upon movement of rod 224 against a cable 218 by cam 242. When it is desired to record relative tensions, plate 272 may be easily and quickly removed from plate 270 and a card similar to card 74 illustrated in FIG. 1, is disposed on plate 270 by a suitable spring clip (not shown). Arm 252 is thus replaced by an arm of lesser length and corresponding to the scales on the card carried by plate 270. Also, clamp 214 is replaced by a hook similar to hook 216 so that the tensiometer takes the form of that illustrated in the embodiment of FIGS. 1–4. It is clear, therefore, that the embodiment of FIGS. 7–11 may be provided with easily interchangeable parts for recording either absolute tensions on a cable or relative tensions on a group of interrelated cables.

Having thus described the invention, what is claimed as new and desired to be secured by Letters Patent is:

1. A tensiometer for determining the tension on a cable, said tensiometer comprising:

a frame provided with a pair of spaced cable engaging devices for mounting the frame on the cable;

an elongated pressure rod slideably carried by the frame between said devices and engageable at one end thereof with said cable when said devices engage the same;

means including a reciprocating tension element on the frame for forcing said one end of the rod against the cable;

a spring interposed between said element and the opposite end of the rod;

cam means engageable with said element for advancing the latter toward the rod to thereby compress said spring, said cam means including a disc having an outer periphery providing a cam surface and mounted eccentrically for rotation about an axis transverse to the direction of reciprocating movement of said element, and a handle secured to and projecting outwardly from the periphery of the disc for rotating the same;

a pair of spaced stops on said frame and engageable with said handle, said stops being disposed to limit the rotation of said disc to a predetermined arc;

a record card on said frame in spaced relationship to said rod;

an elongated arm pivotally mounted intermediate the ends thereof on said frame and operably coupled adjacent one of the ends thereof with said rod, said arm substantially spanning the distance between said rod and said record card and having card marking means thereon adjacent the opposite end thereof, whereby the tension on the cable may be indicated by a mark on said card when pressure is applied to said rod by said element to force said rod against said cable; and means carried by said arm and engageable with said card for maintaining the arm in a fixed position as the card is marked by said card-marking means.

2. In a tensiometer having a frame provided with a pair of spaced, cable-engaging devices for mounting the frame on a cable, and a pressure rod shiftably carried by the frame between said devices, structure for forcing one end of the rod against the cable comprising:

a hollow body having an opening for receiving the opposite end of the rod;

a tension element disposed within the body and movable toward and away from said opposite end of the rod, said element having an end remote from said opposite end of the rod;

a spring interposed between and engaging said element and the opposite end of the rod and biasing the element away from said rod;

a disc having an outer periphery provided with a pair of circumferentially spaced indentations therein;

means mounting said disc on said body for rotation about an axis parallel to the central axis of the disc with said remote end of the element being in engagement with said periphery of the disc, said remote end being movable into one of the indentations as said element approaches one extremity of its path of travel and being movable into the other indentation as said element approaches the opposite extremity of said path of travel, whereby said disc is releasably maintained in a fixed position when said element is at either of said extremities;

and means coupled with said disc for rotating the same.

(References on following page)

References Cited by the Examiner

UNITED STATES PATENTS

| | | | |
|---|---|---|---|
| 316,282 | 4/85 | McCormick | 292—140 |
| 1,871,776 | 8/32 | Chatillon | 73—144 |
| 2,072,705 | 3/37 | Bloomheart | 346—143 X |
| 2,380,898 | 7/45 | Pimentel | 74—107 X |
| 2,618,153 | 11/52 | McKernan | 73—144 |
| 2,986,932 | 6/61 | Melton | 73—144 |

FOREIGN PATENTS 854,462  1/40  France.

RICHARD C. QUEISSER, *Primary Examiner.*
JOSEPH P. STRIZAK, *Examiner.*